US009207307B2

(12) United States Patent
Stolarczyk et al.

(10) Patent No.: US 9,207,307 B2
(45) Date of Patent: Dec. 8, 2015

(54) LARGE AREA GROUND MONITORING

(71) Applicant: Stolar Research Corporation, Rio Rancho, NM (US)

(72) Inventors: Gerald L. Stolarczyk, Placitas, NM (US); Chance Dain Valentine, Raton, NM (US); Jeffrey D. Hutchins, Box Elder, SD (US); Matthew L. Briggs, Albuquerque, NM (US); Richard Brewster Main, Newark, CA (US); Brecken H. Uhl, Las Cruces, NM (US)

(73) Assignee: Stolar, Inc., Raton, NM (US)

( * ) Notice: Subject to any disclaimer, the term of this patent is extended or adjusted under 35 U.S.C. 154(b) by 162 days.

(21) Appl. No.: 14/150,736

(22) Filed: Jan. 8, 2014

(65) Prior Publication Data

US 2014/0125508 A1 May 8, 2014

Related U.S. Application Data

(63) Continuation-in-part of application No. 13/862,379, filed on Apr. 13, 2013, now Pat. No. 9,024,802, and a continuation-in-part of application No. 13/301,762, filed on Nov. 21, 2011, now Pat. No. 8,847,813.

(60) Provisional application No. 61/750,318, filed on Jan. 8, 2013.

(51) Int. Cl.
| | |
|---|---|
| *G01V 3/12* | (2006.01) |
| *G01S 13/88* | (2006.01) |
| *G01S 7/41* | (2006.01) |
| *H01Q 1/32* | (2006.01) |
| *H01Q 1/52* | (2006.01) |
| *H01Q 21/06* | (2006.01) |
| *G01S 7/02* | (2006.01) |
| *G01V 3/17* | (2006.01) |

(52) U.S. Cl.
CPC ............... *G01S 7/414* (2013.01); *G01S 13/885* (2013.01); *G01V 3/12* (2013.01); *H01Q 1/3216* (2013.01); *H01Q 1/521* (2013.01); *H01Q 21/062* (2013.01); *G01S 2007/027* (2013.01); *G01V 3/17* (2013.01)

(58) Field of Classification Search
CPC . G01S 7/414; G01S 13/885; G01S 2007/027; H01Q 1/521; H01Q 1/3216; H01Q 21/062; G01V 3/12; G01V 3/17
USPC ............................................... 342/22, 27, 175
See application file for complete search history.

(56) References Cited

U.S. PATENT DOCUMENTS

| | | | | |
|---|---|---|---|---|
| 5,680,048 | A | * | 10/1997 | Wollny .......................... 324/329 |
| 6,512,475 | B1 | * | 1/2003 | Bogatyrev et al. .............. 342/22 |

(Continued)

FOREIGN PATENT DOCUMENTS

| | | | |
|---|---|---|---|
| WO | WO 2012024133 A2 | * | 2/2012 |
| WO | WO 2012161645 A1 | * | 11/2012 |

OTHER PUBLICATIONS

Kangwook Kim; Scott, W.R., "Design of a Resistively Loaded Vee Dipole for Ultrawide-Band Ground-Penetrating Radar Applications," Antennas and Propagation, IEEE Transactions on , vol. 53, No. 8, pp. 2525,2532, Aug. 2005.*

*Primary Examiner* — John B Sotomayor
(74) *Attorney, Agent, or Firm* — Main Cafe; Richard B. Main

(57) ABSTRACT

A municipal infrastructure maintenance system uses a ground vehicle to move an antenna array in back-and-forth sweeps over large areas or distances. The antenna array comprises dozens of compartmentalized radio dipole antennas arranged laterally, shoulder-to-shoulder across the width of each sweep. An antenna switch matrix is connected between the antenna array and a ground-penetrating-radar (GPR) set and provides electronic aperture switching and selection, and the ability to laterally register one sweep to the next. The antenna array is extended out in front of the ground vehicle on a pivotable boom, and the cantilevered weight is a primary concern. The antenna array is constructed with aluminum-on-aluminum honeycomb panels slotted and folded around dozens of resistive-card compartment separators. Printed circuit boards with matching baluns are also slotted to receive tabs on the resistive cards, and their dipole elements are resistive loaded to quench crosstalk and near field effects.

10 Claims, 12 Drawing Sheets

(56) References Cited

U.S. PATENT DOCUMENTS

| | | | |
|---|---|---|---|
| 6,847,328 B1* | 1/2005 | Libonati et al. | 343/700 MS |
| 7,042,385 B1* | 5/2006 | Wichmann | 342/22 |
| 8,570,207 B1* | 10/2013 | Dawood et al. | 342/22 |
| 2003/0102995 A1* | 6/2003 | Stolarczyk et al. | 342/22 |
| 2005/0057421 A1* | 3/2005 | Mohamadi | 343/853 |
| 2007/0126641 A1* | 6/2007 | Saily | 343/700 MS |
| 2008/0218400 A1* | 9/2008 | Stolarczyk et al. | 342/22 |
| 2010/0277397 A1* | 11/2010 | Scott | 343/904 |
| 2013/0069814 A1* | 3/2013 | Wolfson et al. | 342/22 |
| 2013/0113648 A1* | 5/2013 | Duvoisin et al. | 342/22 |
| 2014/0125508 A1* | 5/2014 | Stolarczyk et al. | 342/22 |
| 2014/0125509 A1* | 5/2014 | Stolarczyk et al. | 342/22 |

* cited by examiner

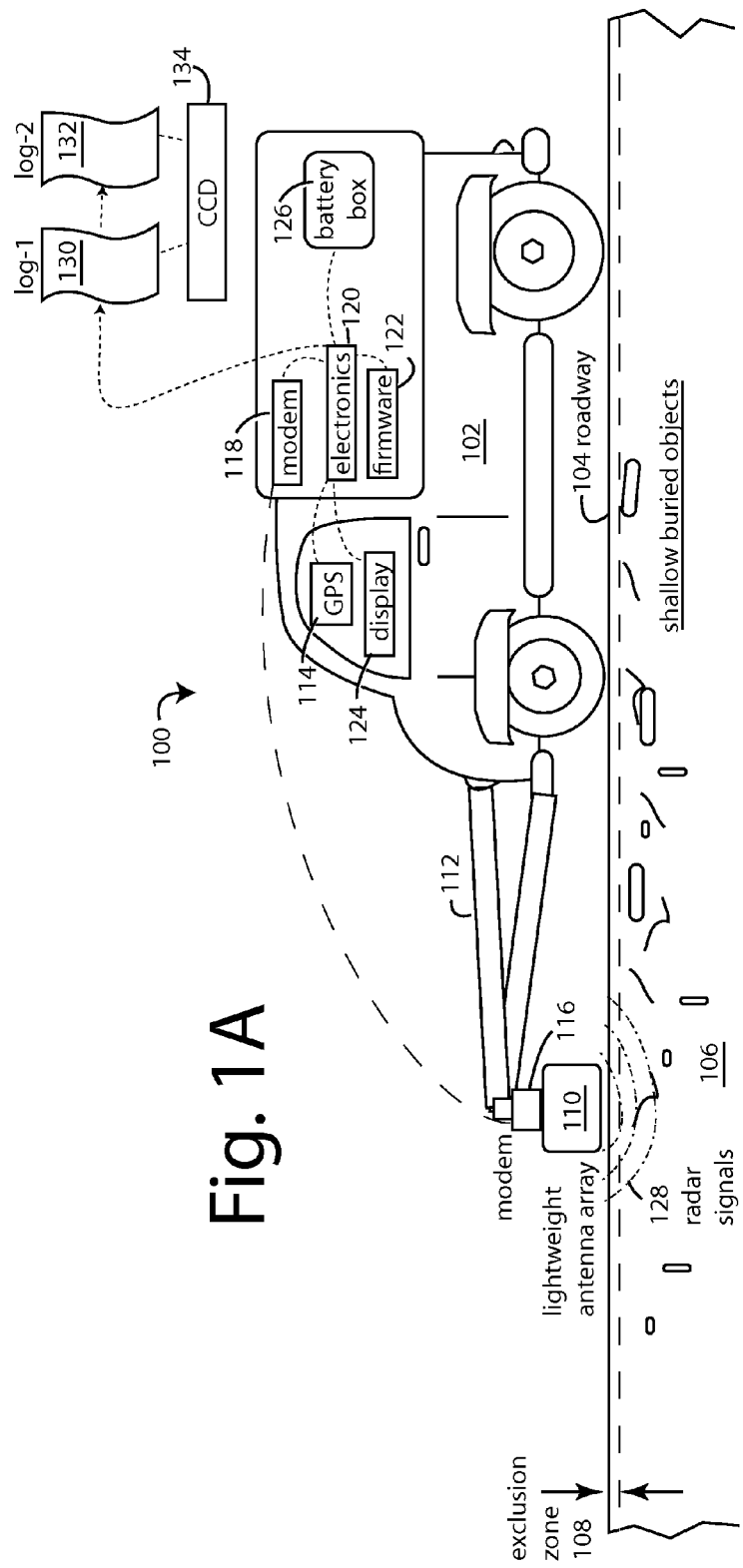

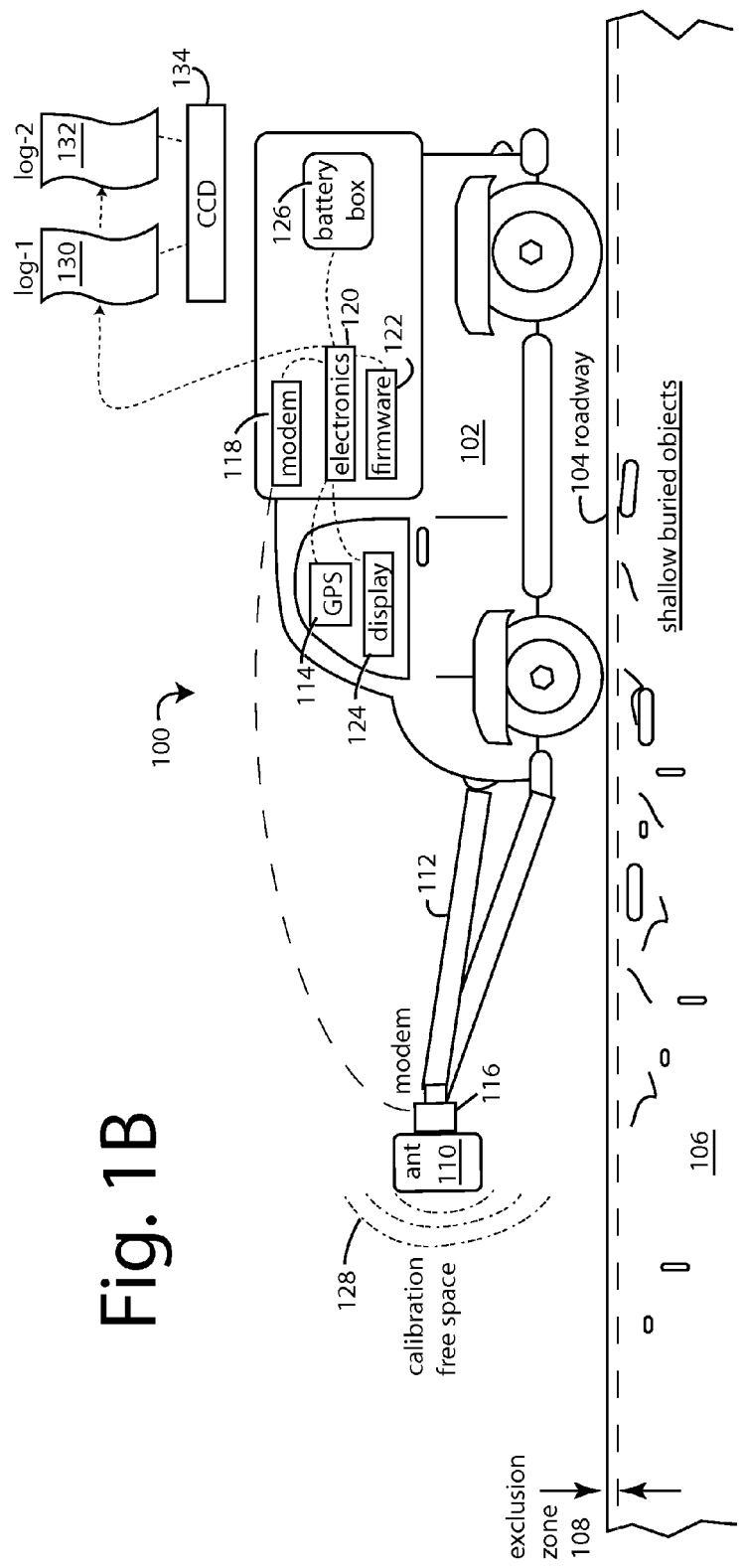

LARGE AREA GROUND MONITORING

RELATED APPLICATIONS

This Application claims benefit of U.S. Provisional Patent Application 61/750,318 filed Jan. 8, 2013, and titled PREDISTORTED DOUBLE SIDEBAND GROUND PENETRATING GRADIOMETRIC RADAR WITH SUPPRESSION OF CLUTTERING REFLECTIONS, by Larry G. Stolarczyk; and it also claims benefit of and is a continuation-in-part of U.S. patent application Ser. No. 13/862,379, filed Apr. 13, 2013, and titled, ELECTROMAGNETIC DETECTION AND IMAGING TRANSCEIVER (EDIT) AND ROADWAY TRAFFIC DETECTION SYSTEM, by Larry G. Stolarczyk; and also a continuation-in-part of U.S. patent application Ser. No. 13/301,762, filed Nov. 21, 2011, and titled, UNSYNCHRONIZED RADIO IMAGING, by Igor Bausov, Gerald Stolarczyk, and Larry G. Stolarczyk.

BACKGROUND

1. Field of the Invention

The present invention relates to the electronic sensing of shallow buried objects in the ground surface over large areas, and more particularly to maintenance systems for monitoring changing conditions and deterioration in municipal infrastructures over time, and for locating, distinguishing and designating small obscured bits and pieces.

2. Description of the Problems to be Solved

Construction crews seem to be routinely ripping accidently into buried wires, pipes, and vaults in spite of many official programs and laws for them not to dig without checking first. Sometimes these failures are harmless and little damage is done, but other times serious and catastrophic breaches can occur that take lives, inflict injuries, and costs millions of dollars.

Not every bit of our infrastructures are fully mapped and known, the smaller, older bits have often escaped being inventoried, cataloged and registered. The problems are especially pronounced in third world countries, war-torn areas subject to quick fixes and unauthorized construction, and areas with long histories of historical use.

Pipes, wires, canisters, tubes, and other manufactured items are made of a variety of materials that will electromagnetically or dielectrically contrast with surrounding soils if buried in the earth.

The trouble is many naturally occurring things can appear to a scanner to be manmade objects that have been recently placed and that were not present in previous scans. For example, a heavy overnight dew can produce puddles of conductive water that will contrast with a more dielectric soil. The shapes these can take often mimic objects of interest.

The present inventors discovered that a resonant microwave patch antenna (RMPA) driven by continuous wave signals kept at resonance can be used as a very sensitive sensor. Changes in the dielectric character of the immediate environment will affect the loading on the RMPA and therefore manifest as changes in its complex input impedance at resonance. Movements and stationary anomalies deep in the ground can be sensed and characterized.

Various kinds of conventional, mobile, portable equipment and methods are in use worldwide to scan the top layers and surfaces of the ground to detect and locate valuable, vulnerable, or hazardous objects. Meteorite hunters routinely use tuned coils sensitive to magnetic materials to sweep for melted and burnt bits of iron and steel that fall to the ground from meteors. Other kinds of metal detectors and ground scanners are used by treasure hunters to find hordes of gold, silver, copper and other precious metals and artifacts. Some are now even equipped with video eyeglasses for three dimensional visualizations.
See:www.okmmetaldetectors.com/products/earthimager/exp5000.php Radar based detectors universally send either continuous wave (CW) or pulsed radio transmissions into the ground so that echoes returned from buried objects can be received and interpreted. As we have described in several of our earlier United States Patents, the so-called "first-interface" between the atmosphere and the top surface of the ground will return a very strong reflection. Such first-interface reflections can completely swamp and obscure the much fainter signals being reflected by small, shallow objects, and/or ones very deeply buried.

Manufactured objects buried in the ground can be constructed as all-plastic, low-metal, and all-metal. The smaller they are overall, the more difficult they will be to detect because they return fainter signals. All-plastic and low-metal objects can avoid or frustrate detection by conventional methods that depend on the presence of iron and an electromagnetic response. Sensors deployed to find these more common objects therefore need to operate in many kinds of modes. The dielectric contrasts of these devices with the surrounding soils can be used to advantage to highlight the object for analysis of signature characteristics.

One-pass and two-pass methods have been conventionally used to find wires, pipes, and other objects-of-interest. One-pass methods must be used when there has been no previous opportunity to make and record a prior sweep or survey.

Two-pass methods can have advantageous benefits, but a preliminary sweep of the ground must be collected to determine one or more baseline conditions. Fortunately, rugged high capacity storage media is now widely available at an economic price. New data from subsequent sweeps can be compared to data from the prior sweeps to highlight any changes, and this advantageous technique is broadly referred to as "change detection".

Many changes can be quite benign or of no interest whatsoever, e.g., puddles from a recent rain, morning dew, roadside debris, construction, ruts, footprints, and other ordinary events. Very few changes will actually signal something of interest has been detected. Often what is of interest are things that were deliberately placed in the interim, and such indications are too important to be missed or misinterpreted.

An artifact clutter can occur at the surface that will trigger many false positives. Too many false positives will discredit the equipment, and its operators will grow not to trust the reports.

In the one-pass method, virtual nicks and barbs will appear in a three dimensional spiral function that plots real and imaginary RMPA impedances against depth. Homogeneous soils and other materials will return a smooth function resonant detection impedance spiral.

Plastic or metal objects that differ in their dielectric characteristics from the surrounding soils will manifest electronically as inward or outward spikes on the spiral function. Software interprets these spikes as possible objects and their magnitude are telltale of their relative sizes.

In the two-pass method, ground-penetrating-radar (GPR) data is registered to location reference system for later comparison with subsequent passes. The scans from each run are compared, and new objects found in the comparisons are highly probable to be some type of object or preparation worthy of further investigation or avoidance.

Innocent and natural changes can occur in the ground surface between a first and a second pass. For example, changes in moisture can occur that result from rain, dew, and afternoon drying in the sun. Foot and vehicle traffic can leave behind soil compressions and puddles that were not there on the first pass. Such innocent and natural changes have created an intolerable number of false positives in conventional equipment.

There is a need for a device and system that can electronically detect and characterize things around roadways and through the ground, but which has a much lower false alarm rate.

SUMMARY OF THE INVENTION

Briefly, a municipal infrastructure maintenance system embodiment of the present invention uses a ground vehicle to move an antenna array over large areas or distances. The antenna array comprises dozens of compartmentalized radio dipole antennas arranged laterally, shoulder-to-shoulder across the width of each sweep. An antenna switch matrix is connected between the antenna array and a ground-penetrating-radar (GPR) set and provides electronic aperture switching and selection, and the ability to laterally register one sweep to the next. The antenna array is extended out in front of the ground vehicle on a pivotable boom, and the cantilevered weight is a primary concern. The antenna array is constructed with aluminum-on-aluminum honeycomb panels slotted and folded around dozens of resistive card compartment separators. Printed circuit boards with matching baluns are also slotted to receive tabs on the resistive cards, and their dipole elements are resistive loaded to quench crosstalk and near field effects. The several compartments in the antenna array are filled with rigid encapsulating foam.

An alternative embodiment uses an automatic frequency control to keep a continuous wave (CW) transmission tuned to the changing resonant frequencies of resonant microwave patch antennas (RMPA) in the antenna array. Changes in the RMPA loading and the bulk dielectric constant of mixed media in front of the RMPA will affect its resonant frequency and more importantly its input impedance. Various shifts in the measured input impedance of a directional RMPA over short periods are interpretable as significant objects worth monitoring or just debris. The phase angles of the measured input impedance scan indicate the objects' positions and character.

Other embodiments of the present invention build in so-called "rejection zones" which are tuned to the surface depths subject to such inconsequential dielectric variations. Valuable, critical, dangerous and harmful objects will be deeper, in the layers usually obscured by the strong radar reflections conventional radars suffer coming from the ground surface. The double sideband gradiometric (DSBG) methods employed here can achieve up to 70-dB of clutter rejection, thus improving false positive performance.

These and other objects and advantages of the present invention will no doubt become obvious to those of ordinary skill in the art after having read the following detailed description of the preferred embodiments which are illustrated in the various drawing figures.

IN THE DRAWINGS

FIG. 1A is a side view diagram representing a municipal infrastructure maintenance system that uses a ground vehicle to move an antenna array over large areas or distances;

FIG. 1B another side view diagram of the municipal infrastructure maintenance system and ground vehicle of FIG. 1A, but showing how the antenna array has been pivoted up to point forward into free space for antenna calibration;

Figure 8:
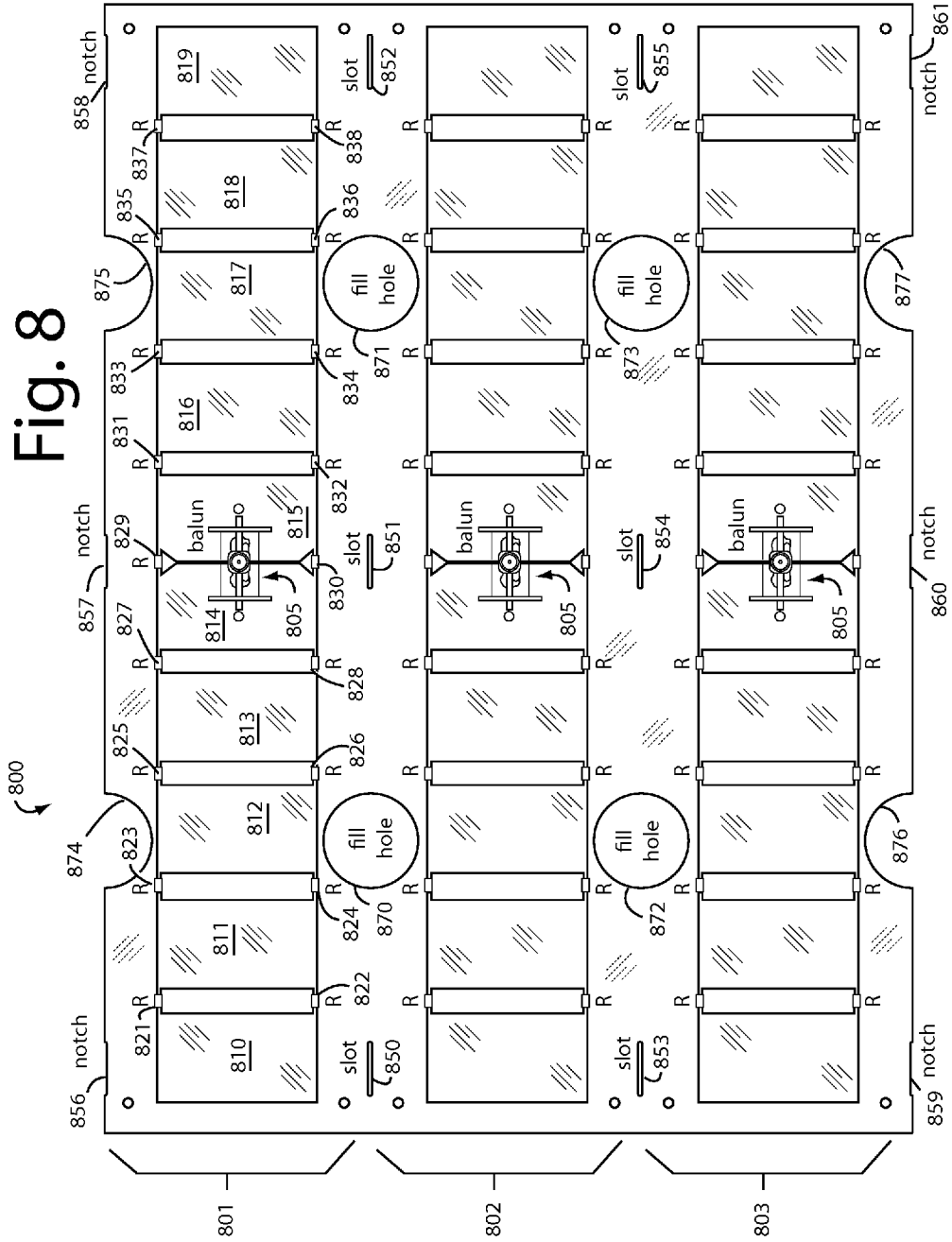
FIG. 8 is a top view diagram of a triple dipole antenna arrangement on one printed circuit board. A typical application would use eight such PCB's arranged edge-to-edge to make an array of twenty-four.
Figure 9:
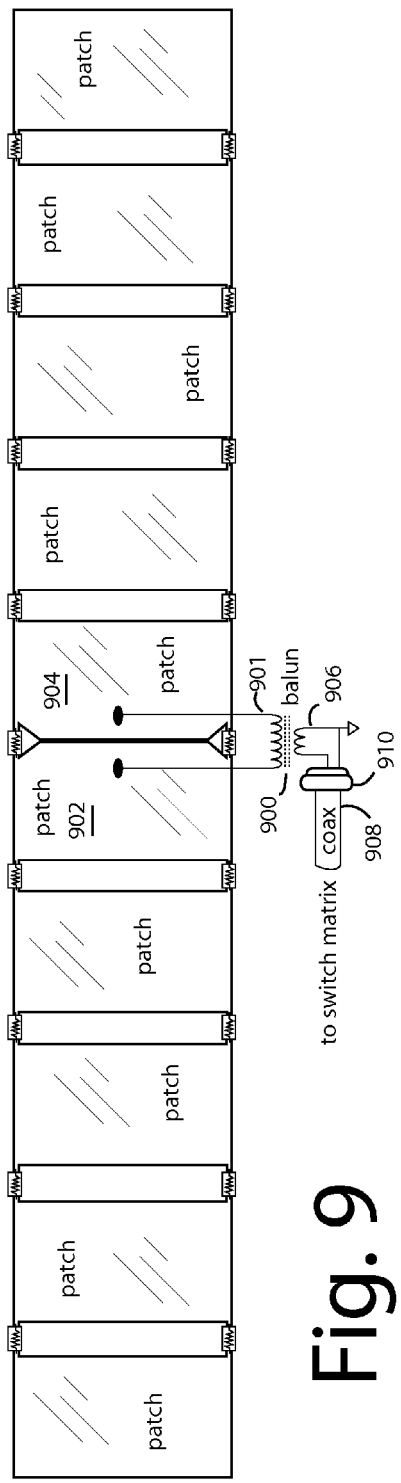
FIG. 9 is a top view diagram of a single one of the dipole antennas of FIG. 8, and schematically shows the electrical connection and matching needed to the antenna switch matrix.
Figure 10:
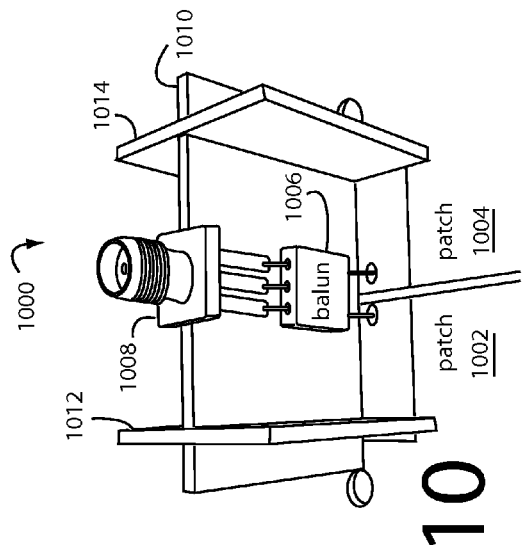
Figure 11:
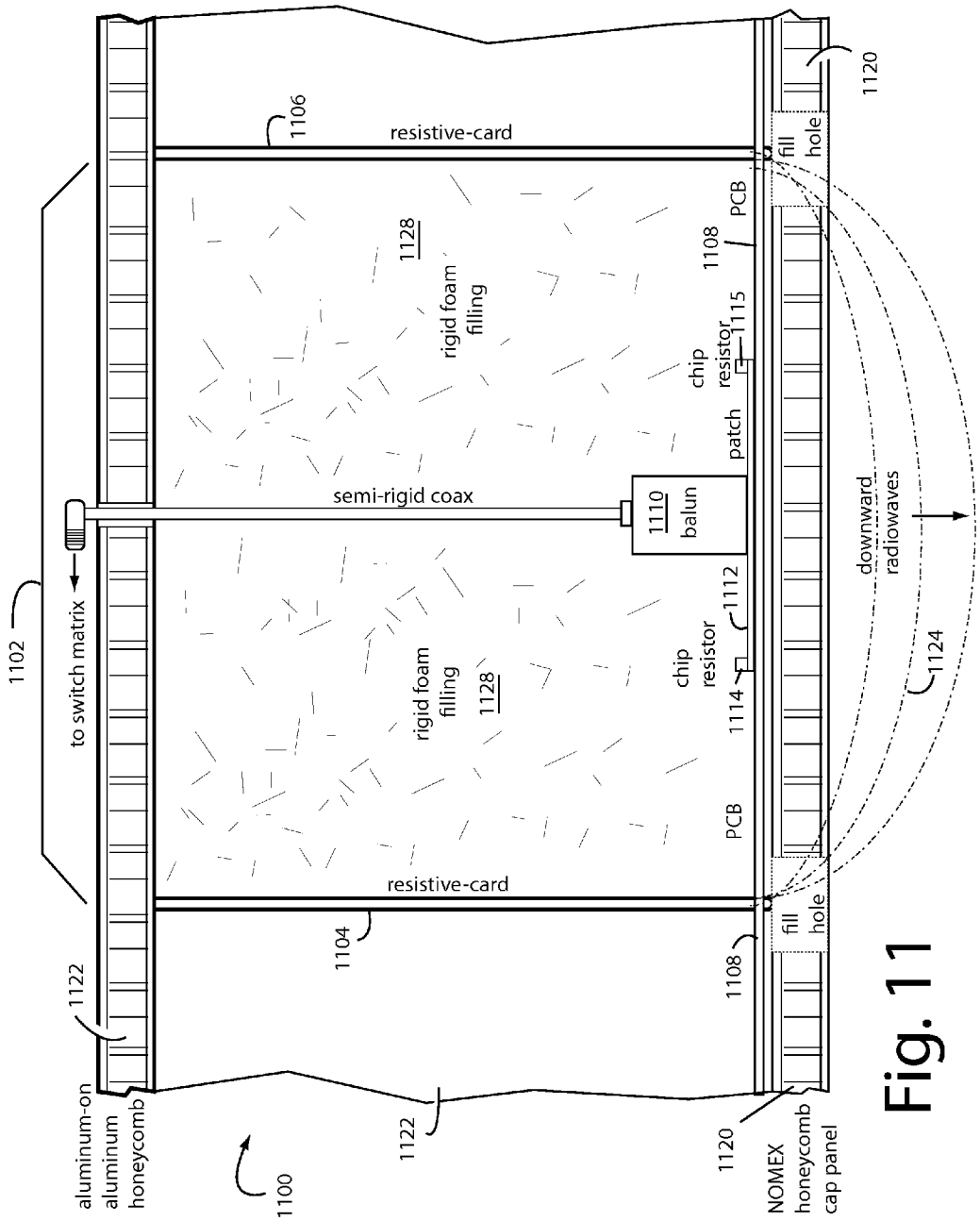

FIG. 10 is a perspective view diagram of the balun as used in FIGS. 8 and 9, and is intended to provide insights into how the baluns can be constructed for rugged service in the application illustrated in FIGS. 1A and 1B; and FIG. 11 is a cross sectional view diagram of the lateral antenna array of FIG. 1A taken on a left-right lateral, vertical plane, and showing the rigid foam filling that is expanded between resistive cards in each dipole antenna compartment.

Figure 12:
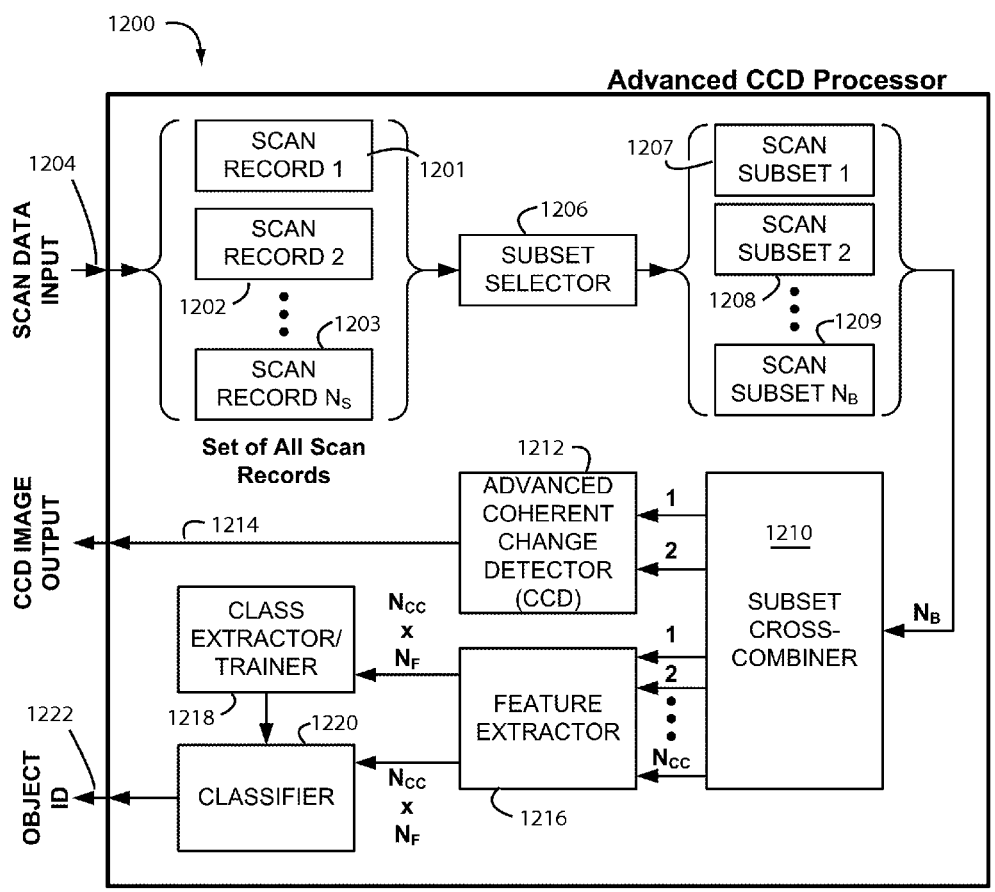

FIG. 12 shows an advanced coherent change detection (CCD) processing module with the internal functional elements of the module included in the diagram.

DETAILED DESCRIPTION OF THE PREFERRED EMBODIMENT

FIGS. 1A and 1B represent a municipal infrastructure maintenance system 100 that uses a typical ground vehicle to move a lateral antenna array over large areas or long distances.

FIG. 1B illustrates how such antenna array can be pivoted up to point forward into free space for antenna calibration. A truck 102 is normally driven over a common roadway 104.

A clutter 106 of subsurface objects will always exist shallowly in and under roadway 104. These represent pieces of municipal infrastructure, natural artifacts, long ago buried debris, and recently buried things. Above-the-surface and very shallow objects that are usually of no interest are excluded from investigation when an exclusion zone 108 is electronically implemented with radar techniques described herein.

During operation, a lightweight, multi-element, multi-compartment, lateral linear antenna array 110 is lowered down into position on a hydraulic or winched boom 112 about one foot over roadway 104. A global positioning system (GPS) navigation receiver 114 is used to repeatably and continuously report the accurate positions of the antenna array 110 in real-time during each sweep.

A so-called P-code authorized GPS receiver type can be advantageous because of the high navigation solution rates and accuracies obtainable. A pair of modems 116 and 118 communicate radar information obtained about the subsurface clutter 106 to an electronics module 120. Modem 116 includes an antenna switching matrix for selecting which of dozens of individual dipole antenna elements in the linear antenna array 110 will be activated for use as a transmitter and which other antenna element is to be used as a receiver at any one instant. In general, the frequency ranges used for such GPR are 100-MHz to 400-MHz, about one meter or more in wavelength.

The electronics module 120 is ruggedized to operate and survive years of hard service on a moving truck 102. It is essentially a general purpose computer and radar signal processor with software-defined functionality provided by a firmware program 122. A user display 124 is provided for a driver. A battery box 126 includes rechargeable batteries, a charger, and voltage/current regulation. Such a battery box 126 provides uninterruptable power to the electronics module 120.

In operation, battery power voltage taken from the vehicle will show the boosting effects of its generators, e.g., input voltage exceeds 28.0 volts. But when the vehicle is shut off that input drops to zero and the internal batteries must take over. They will sag in voltage under load from 24.0 to 26.0 volts at the output, depending on charge and discharge duration. The electronic module 120 is equipped to sense this drop and is programmed with firmware 122 to commence an immediate, but orderly shutdown. The battery box 126 will deplete in a few minutes under maximum load.

Firmware program 122 executes on a microcomputer within electronics module 120 to bring in and process ground penetrating radar (GPR) signals 128 and GPS navigation data. Each scan of subsurface 106 is cataloged, characterized, and logged by its location under the roadway 104 into a log. If the collection is a first pass, the data is logged into a log-1 130, or if a second pass then into a log-2 132. Additional, passes are logged in a similar manner. They are compared and registered by a coherent change detection (CCD) processor 134. If the first and second passes log-1 and log-2 were perfectly registered with one another they could simply be subtracted and the difference would represent any newly arrived clutter in 106.

Advanced processing algorithms that go beyond the present state of the art can be advantageously applied in an advanced CCD processor in place of the traditional CCD processor 134. In such an advanced CCD processor, complex processing of two or more subsets of all of the sweeps or "runs" where data is taken over the same scan area are computed and used to determine additional information such as the time-evolution of the detected signals from the sensor. This history from many runs can be used to better understand subsurface changes, which can result in improved target classification and false alarm mitigation. Furthermore, advanced machine learning techniques may be applied in the advanced CCD processor wherein pre-trained or self-trained classification engines such as a standard support vector machine (SVM) are used to perform detected object classification. An example advanced processing algorithm would use the data from many daytime sweeps to determine the average intensity, variance of intensity, and size of presumed clutter objects and use that data as features to train the SVM classifier, which would later be used to automatically declare detected objects as clutter or potential objects of interest; similar night-time data could be used to develop additional information regarding natural temperature or other day-night differences to further refine the probability of detection of targets of interest and also reduce false alarm rate. Many similar such examples are possible, a primary innovation of the method being the use of combinations of sweep data that go beyond comparisons limited to that gathered from a single initial baseline scan.

Eliminating artifacts observed in the exclusion zone 108 would further reduce the analytical chore of characterizing each new object detected in clutter 106. Alternative embodiments of the present invention depart from this prior work in that shallow clutter at the surface in exclusion zone 108 is completely rejected by a suppressed carrier, double-sideband method already patented by the present inventors. See, U.S. Pat. No. 7,656,342, issued Feb. 2, 2010. The depth of data collection is typical comply limited to those depths of objects that can be easily or inadvertently exposed or disturbed by surface vehicles, e.g., no more than a foot or two of depth. Other applications will require deeper investigations.

Practical, real world coherent change detection (CCD) processing of GPR signals 228 obtained from two sweeps, passes and scans is described in more detail in Published U.S. Patent Application, US 2013-0050008, by Robert Atkins, et al., published Feb. 28, 2013.

Invariably the location logging according to GPS fixes will not be ideal and contain errors of scale, skew, position, and solution uncertainty. Display 124 is provided for the driver to follow a particular path, but no two vehicle passes down roadway 104 can ever be identical. It therefore falls on the firmware program 122 to include coherent change detection. Current radar data is therefore registered to prior data on a scan-by-scan basis by novel pattern-matching algorithms, though these algorithms do not include advanced machine learning techniques such as SVM classifiers or comparison between subsets drawn from among two or more available scans. The registration process adjusts the vehicle height and roll data to compensate for pass-to-pass differences in pitch, roll, and elevation. The characteristics and signatures of the subsurface objects 106 are used to determine the current location of the antenna array 110 relative to previous passes.

Antenna array 110 must be lightweight and rugged in order to be usefully employed this way on a long boom 112. The exact nature and detail of its construction are described in copending patent applications filed by the present inventors. The antenna array 110 is electronically and mechanically configured to allow pass-to-pass compensation of the unavoidable offsets that will occur. The constituent antenna elements are resistively loaded patch dipoles in a linear array of elements, and are very closely spaced only a small fraction of a wavelength apart. The operational result is most of the antenna elements on a current pass will be within a fraction of a wavelength from the true position of a corresponding element on a previous pass. CCD registration is used to adjust which antenna elements are to be selected by the switching matrix in modem 116.

The individual patch dipole antenna elements are enclosed in a box-cavity and backplane that shields the array of them from the radio environment to the sides and above. The box enclosure acts to produce a directional ground penetrating radar beam 128 downward into the roadway 104. The virtual position of the antenna array 110 can be electronically shifted left-right element-by-element. The signals received at the new element positions can be used to coherently cancel with historical signals received previously by each element position prior to any virtual shifting the array.

Such use requires that every element must be an electronic match to its neighbors, both in the near-field and the far-field. So, any cavity modes associated with the box-shaped cavity are necessarily suppressed. Lossy, high dielectric ferrite tiles are used as end-caps on the array, and resistive cards are inter-digitated between the antenna elements to reduce mutual coupling.

The conceptual details of such an antenna array and its operation in this application are outlined by Robert Atkins, et al., in U.S. Patent Application US-2013-0050008-A1, published Feb. 28, 2013, and such is incorporated herein, in full, by reference.

Boom 112 must also be lightweight, rugged, articulated, and easily removed and reinstalled by drivers/technicians. It should be constructed such that it can raise up antenna array 110 up out of harm's way while driving between jobs. And yet the boom must be able to be reliably and quickly lowered back down to begin operations over the roadway and at a consistent height. A terrain following or collision avoidance mechanism could also be advantageous.

In general, embodiments of the present invention include and make possible the design, fabrication, and testing of hardened, rugged, mobile, and deployable ground penetrating radar hardware. This means the equipment must be able to function reliably and consistently while being abused by operators, bad weather, harsh environment, strong vibration, extreme heat, and even bullets.

Figure 2:
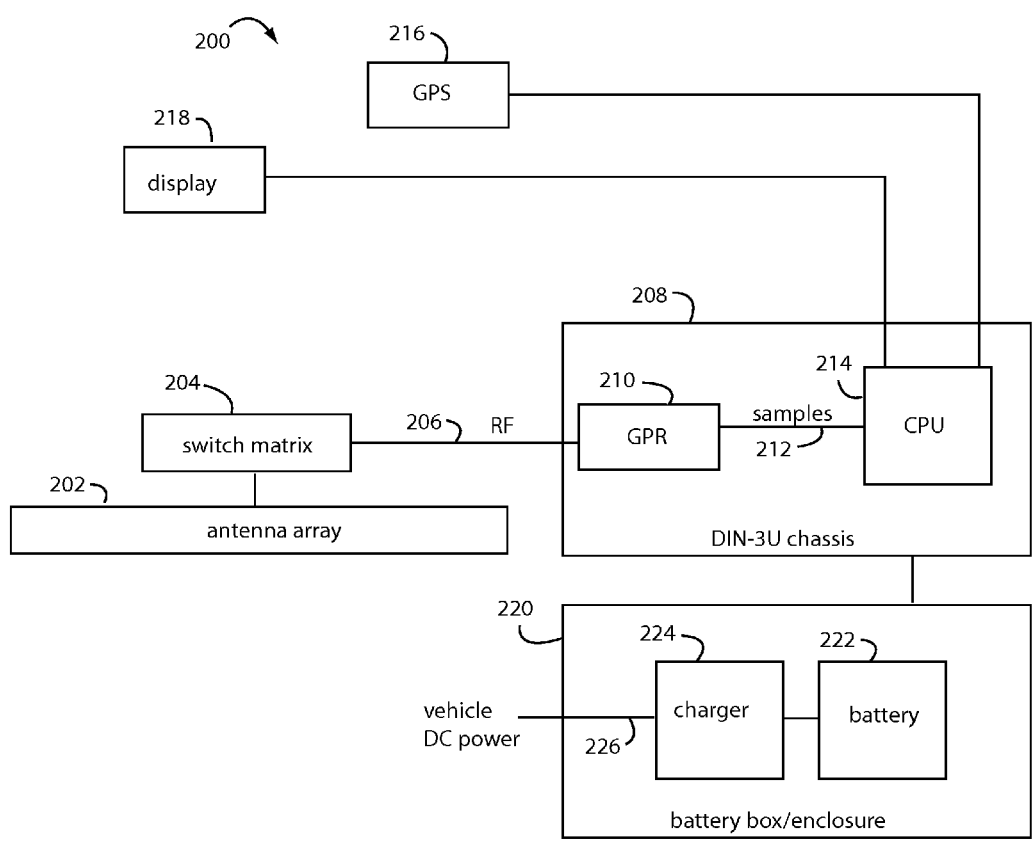
FIG. 2 is a functional block diagram of an electronic road sensing system or mobile ground penetrating radar (GPR) system for finding shallow buried objects.

FIG. 2 represents the electronics equipment 200 used in system 100 of FIGS. 1A and 1B. An antenna array 202 is equipped with a switch matrix 204. This is linked by radio frequency (RF) modems or hardwire 206 to a DIN-3U chassis 208. A GPR card 210 includes a software defined ground penetrating radar set that produces in-phase and quadrature-phase (I, Q) digitized samples 212. These are processed by a single board computer (SBC) 214. A GPS navigation receiver 216 provided concomitant location fixes with corresponding I-Q samples 212. Rendering of objects 106 and their corresponding ground locations are rendered by SBC 214 on a user display 218.

A battery box 220 includes rechargeable batteries 222, and a charger 224 with voltage/current regulation. Such battery box 126 provides uninterruptable power to the electronics module 120 from inside a rugged, weatherproof enclosure. For example, a NEMA-4 class outdoor enclosure with door gaskets.

In operation, battery power voltage taken from a typical vehicle will be boosted by its generators. The input voltage 226 will typically exceed 28.0 volts. But when the vehicle is shut off that input drops to zero and the internal batteries must take over. They will sag in voltage under load to 24.0 to 26.0 volts at the output, depending on charge and discharge duration. The electronic module 120 is equipped to sense this drop and is programmed with firmware 122 to commence an immediate, but orderly shutdown. The battery box 126 will deplete in a few minutes under maximum load.

Figure 3:
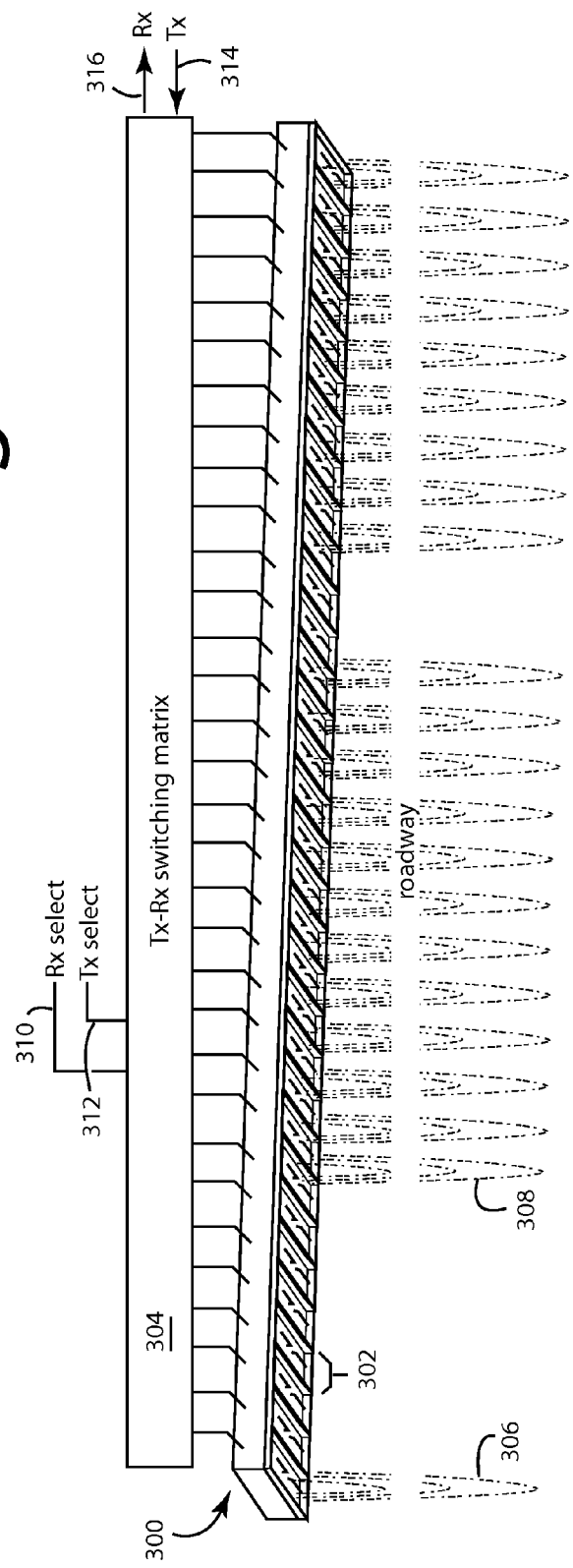
FIG. 3 is a perspective view diagram and schematic of how the antenna array of FIG. 2 can be divided into many compartments with dozens of individual antennas and made selectable through a switching matrix.

FIG. 3 represents a multi-element linear antenna array 110, which can be used like antenna array 110 in FIG. 2. The multi-element linear antenna array 110 comprises dozens of matched dipole VHF patch antenna elements 302 arranged and equally spaced in a single row to span a wide lateral swath, for example across roadway 104 (FIG. 2). Each dipole antenna element 302 is matched to and duplicates the others. All are thus fungible and capable of being switched in or out variously as transmitting or receiving antennas, and independently connected to a radar transmitter and a radar receiver.

The individual antenna elements 302 are independently cycled in sequence during each lateral scan of roadway 104. At any one instant, a switching matrix 304 will connect only one such antenna element to a radar transmitter 306 and only one other such antenna element to a radar receiver 308. Thus a variety of perspectives is possible.

In one application, each scan will sequentially employ every antenna element as a transmitter with every other antenna element as a receiver for the instant transmitter. Synthetic-aperture radar (SAR) is very similar, where finer spatial resolutions are made possible across the breadth of a roadway. But here, the lateral SAR antenna movement is virtual and controlled electronically in steps by the switch matrix. Longitudinal SAR antenna movement is real and obtained in steps, scan-by-scan as vehicle 102 moves along roadway 104.

Characteristic patterns in the radar data obtained from the shallow buried objects 106 and GPS 114 are used to control the switching matrix so that virtual radar data can be collected from the same antenna-pair perspectives above roadway 104 on a second pass that were used during a first pass.

Registering successive scans to each other is needed to cancel out the adverse effects caused by the antenna array 110 passing along slightly offset pathways. Keeping the vehicle pathways exactly the same on subsequent passes would only be possible with something like a railed vehicle on a railroad track. Otherwise, with a wheeled vehicle steered by a driver there needs to be some electronic compensation employed to normalize the scans obtained on serial passes.

The necessary scan rates are empirically derived from vehicle speed, target signal-to-noise ratios (SNR), and the object-of-interest resolution required along-track. A scan rate of 50 Hz to 100 Hz would be typical at a vehicle speed of 10 MPH.

The close physical spacing of the antenna elements can allow significant levels of signal cross coupling amongst them. They are therefore phase matched, electrically compartmentalized, and resistively loaded. The transmit beams and receive patterns are normalized in both the near-field and the far-field.

The system described by Atkins (US 2013-0050008) is not so easily mounted to a vehicle and operated in the field at remote locations. These pieces must be economical to manufacture, and easy to install, operate, and maintain. They must not be overweight or overload the cargo carrying abilities of the vehicle, nor can they demand excessive levels of battery power. How all these things are done is the subject matter of the present invention.

The electronics module 208 comprises a DIN-3U rackmount chassis with custom designed 12-layer PCB boards to achieve the necessary space reductions, ruggedness, and field maintainability.

Unbounded, the weight of antenna array 110 can exceed a thousand pounds, and yet a practical limit for it would be more like two hundred pounds. One way to do this is to minimize the use of ferrite tiles. Antenna array 110 occasionally requires calibration. In order to do this the antenna array 110 needs to be rotated to point forward or be lifted up so that all it "sees" is free space. As an example, as in FIG. 1B. The mounting system is therefore configured to enable such calibrations in the field.

FIG. 3 represents a lateral antenna array 110 having dozens of individual, compartmentalized dipole antennas 302. These are organized and switched into transmitting and receiving pairs by an antenna switch matrix 304. Antenna radiation patterns 306 and 308 represent an active pair of dipole antennas selected by a receiver select control 310 and a transmitter select control 312. The switching can be very rapid and help provide many different radar apertures from essentially the same position along a roadway. The switching can also be used to left-right register an aperture to the same one used on a previous sweep even though the lateral antenna array may be actually physically mis-registered a foot or two.

The circuitry, wiring, and general construction of all the individual dipole antennas 302 are all carefully matched and tuned. A transmit signal 314 and a receive signal 316 will travel the same circuit distances and encounter the same antenna characteristics no matter which have been selected by switch matrix 304.

Figure 4:
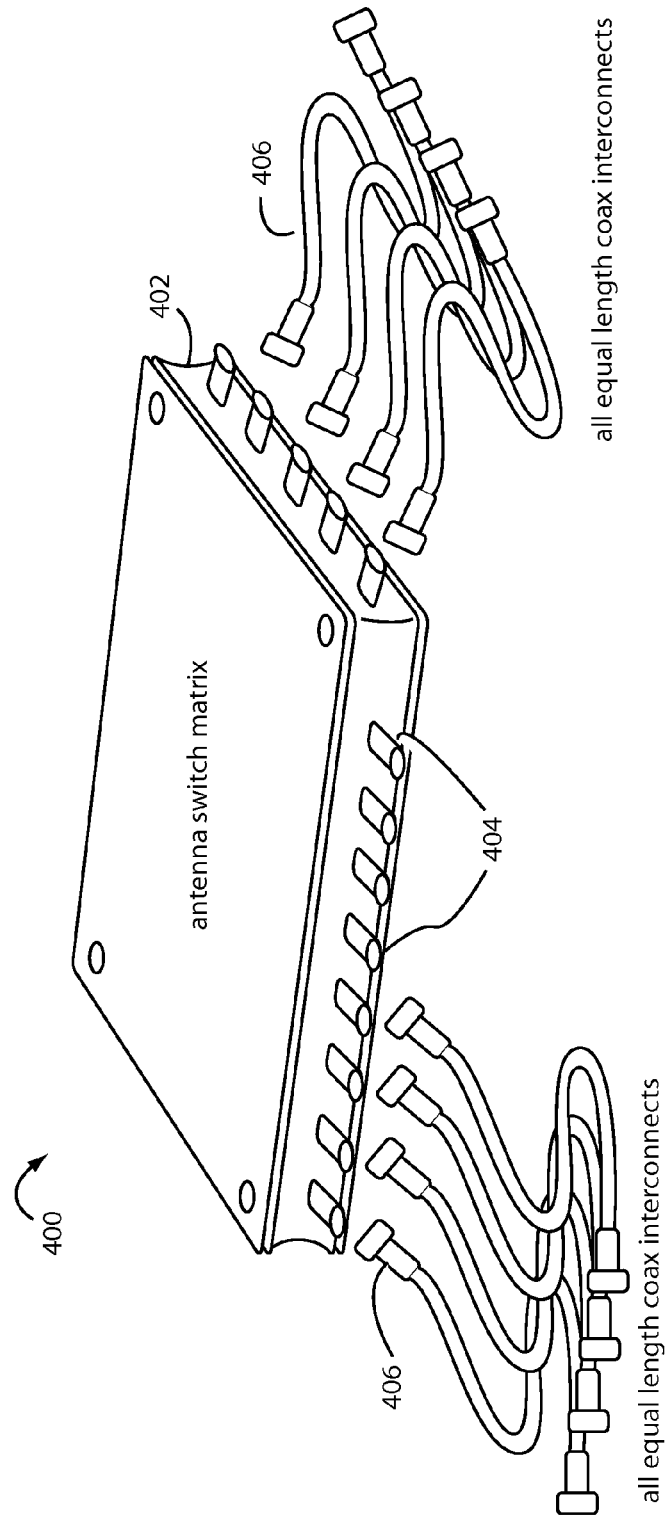
FIG. 4 is a perspective view diagram of one way to construct an antenna switching matrix.

FIG. 4 represents an antenna switch matrix 400 in an embodiment of the present invention. The antenna switch matrix 400 needs to be constructed very ruggedly and its enclosure 402 provides a protected environment for a large printed circuit board inside. Several coax barrel connectors 404 are bulkhead mounted along all four edges. These are interconnected with the individual dipole antenna 302 (FIG. 3) by equal length, matched coax cables 406. The antenna switch matrix 400 mounts in its own compartment on top of the lateral antenna array 110 (FIGS. 1A and 1B).

Figure 5:
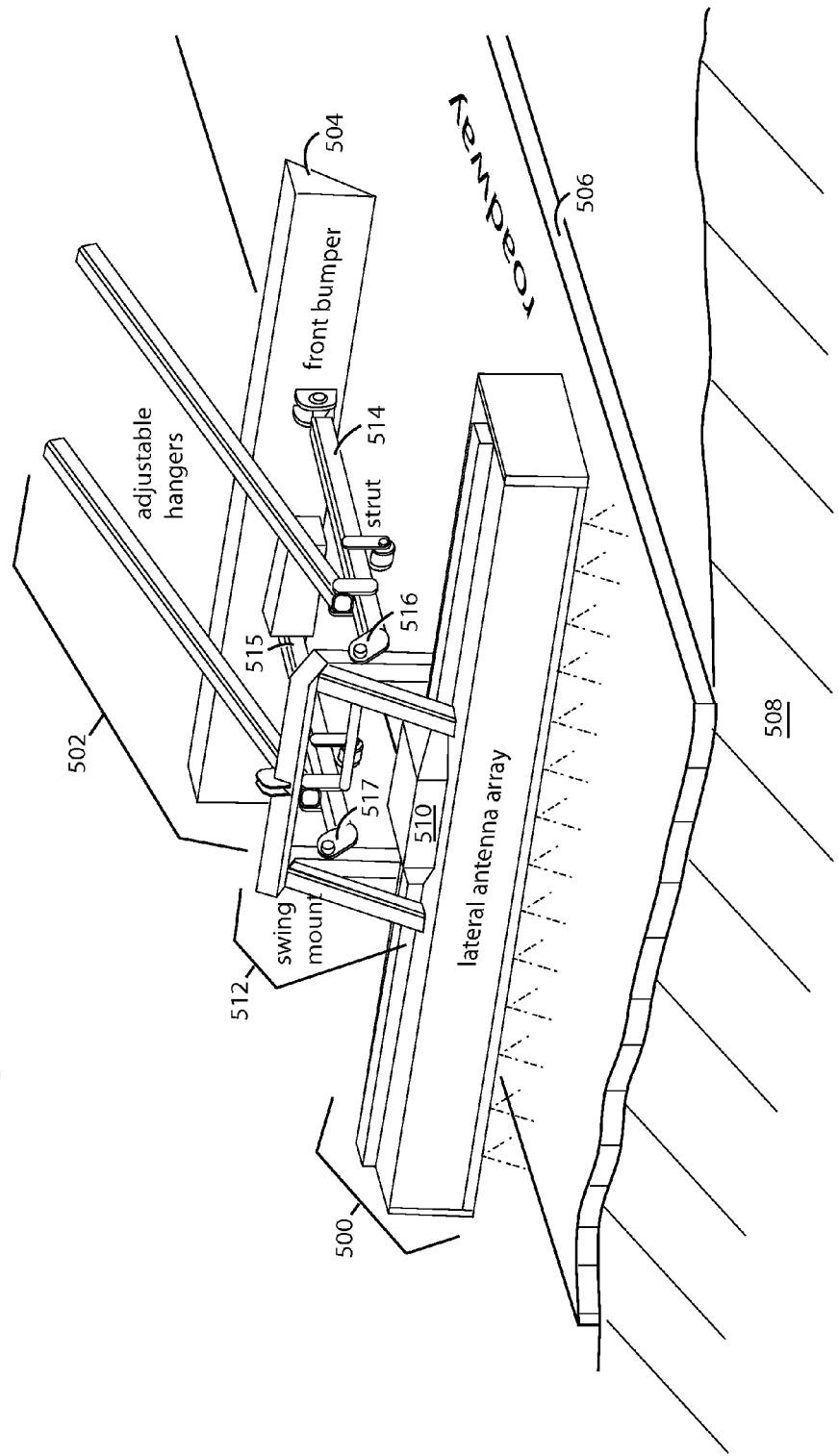
FIG. 5 is a perspective view diagram of a lateral antenna array that can be pivoted up to point forward on cantilevered boom to allow for calibration and stowage.

FIG. 5 represents a lateral antenna array 500 on an adjustable cantilever boom 502 for mounting on a vehicle's front bumper 504. In one embodiment, the lateral antenna array 500 comprises two dozen microwave dipole antennas in a compartmentalized liner array. In operation, the lateral antenna array 500 is pointed downward into a roadway 506 to electronically image buried objects below the surface in soils 508. For example, it could be used to locate land survey markers that were paved over by overly enthusiastic asphalt crews.

These two dozen compartmentalized microwave dipole antennas are individually and separately connected via short coax cables to a switch matrix 510. The switch matrix 510 can quickly select which antenna is to be used for transmitting and which is to be used for receiving.

A swing mount 512 mechanizes the lateral antenna array 500 to be able to swing up under winch or hydraulic power to point forward for calibration or to be stowed up out of the way. (Calibration requires free space be in front of the antennas so they are not loaded and a baseline can be established.) A pair of struts 514 and 515 push the lateral antenna array 500 out on a cantilever and are terminated on their distal ends by hinges 516 and 517.

For many reasons, not the least of which is good weight balance when mounted on a vehicle, the lateral antenna array 500 must be as lightweight as possible. Therefore thin-wall aluminum is used as much as possible throughout for the structural components. Furthermore, the use of fastener hardware and jointing plates is to be avoided, something that the present invention achieves well. A principal goal is to keep the weight under one hundred pounds.

Figure 6:
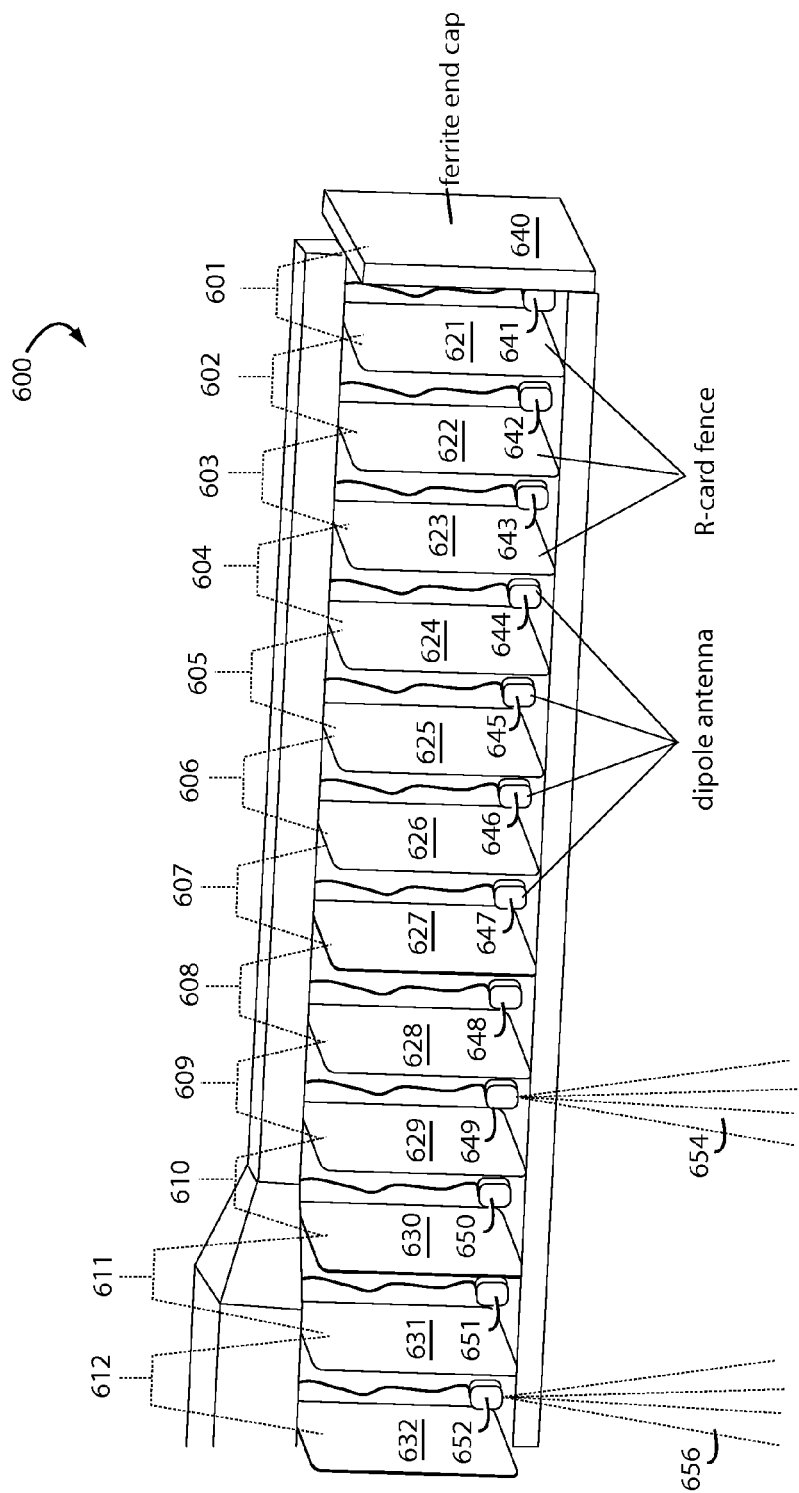
FIG. 6 is a partial cutaway diagram of a portion of the lateral antenna array of FIG. 5 showing how the various individual dipole antenna compartments are separated with lightweight resistive-cards to control and reduce crosstalk in one embodiment of the present invention.

FIG. 6 represents a portion 600 of the lateral antenna array 500 of FIG. 5 showing how various individual dipole antenna compartments 601-612 are separated with lightweight resistive-cards 621-632 to control and reduce crosstalk, e.g., in one embodiment of the present invention. An outer aluminum on aluminum honeycomb panel that covers the top, front, and back is essentially shown in FIG. 6 as removed. More details about this aluminum panel are described with FIG. 7.

A ferrite tile end cap 640 completes the outside ends of the antenna array 600. Each dipole antenna 641-652 is carefully matched to the others so the antennas can be "moved" electronically by switching without introducing artifacts that would confuse the measurements obtained. Here, dipoles 649 and 652 are shown as radiating downward beams 654 and 656.

Figure 7:
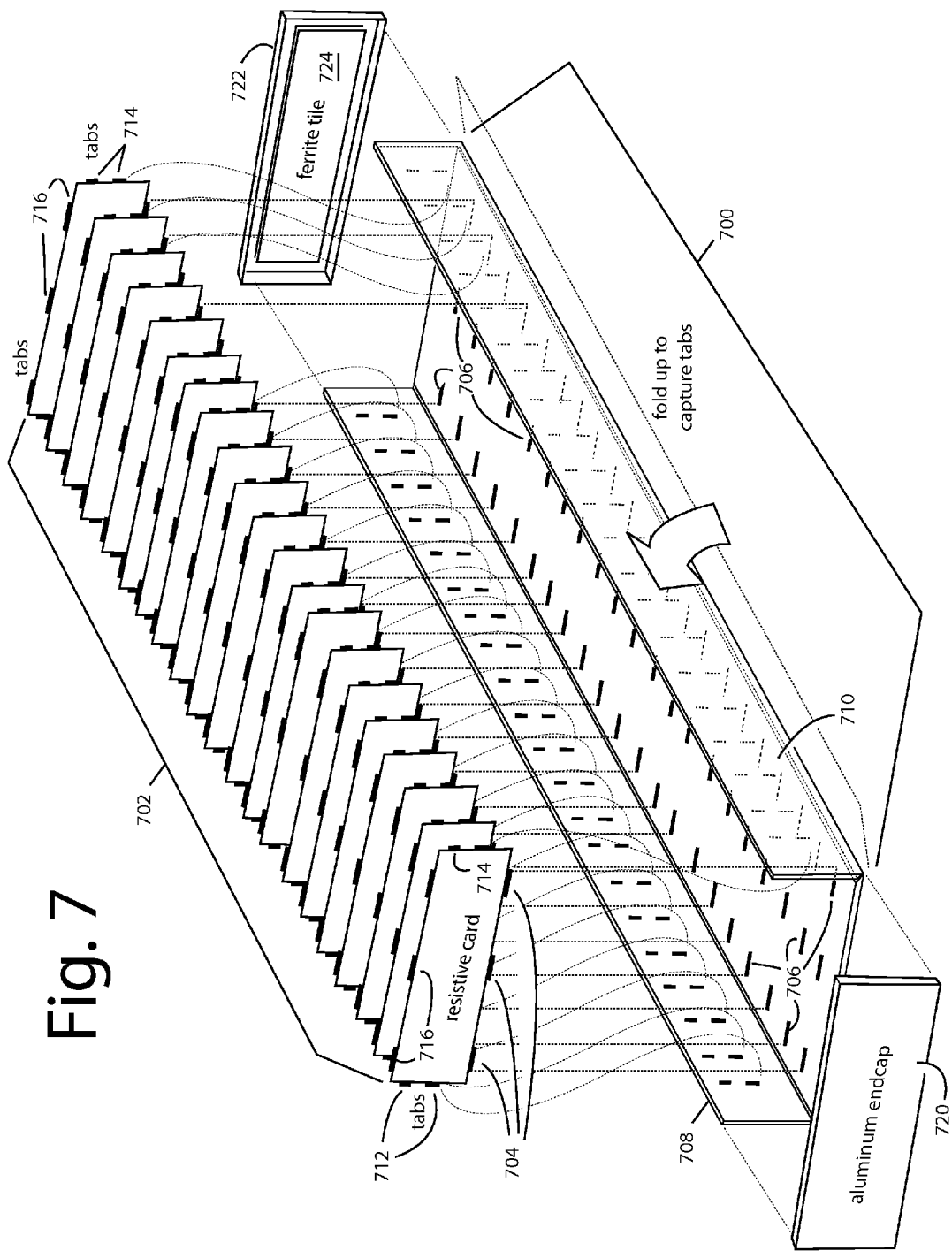
FIG. 7 is a perspective view exploded assembly view diagram of an antenna array like those shown in FIGS. 1A, 1B, 2, 3, 5, and 6. Only the top portion is shown, upside-down, to illustrate how dozens of resistive cards are captured and held without brackets and fasteners by folding together the panels over them.

FIG. 7 represents the unique way that an outer aluminum-on-aluminum honeycomb panel 700 is slotted inside to capture the tabs on a number of resistive cards 702. FIG. 7 shows panel 700 upside-down. During manufacture, a row of top tabs 704 on resistive cards 702 are dropped into corresponding inside-top slots 706, while front 708 and back 710 are folded up to engage tabs 712 and 714. Panel 700 thereby covers the top, front, and back of antenna array 500 (FIG. 5).

In a later manufacturing step, bottom rows of tabs 716 on resistive cards 702 will be used to engage corresponding slots on a lateral row of dipole antenna printed circuit boards (PCB) described with FIG. 8.

A pair of aluminum end-caps 720 and 722 electrically close the ends of the antenna array and provide some loading and interference suppression with ferrite tiles, e.g., 724. Such ferrite tiles are epoxied to the inside surfaces, and end-caps 720 and 722 are fabricated into shallow open end rectangular boxes folded on a brake from sheet aluminum. In instances where the ferrite tile material must be puzzled together from smaller pieces, a sheet of epoxy-fiberglass board is adhered on over the width of all of them to add resistance to vibration.

FIG. 8 illustrates a dipole antenna printed circuit board (PCB) 800 in an embodiment of the present invention. Each PCB 800 has three resistor-loaded planar dipole antennas 801-803 arranged shoulder to shoulder and on the same plane. PCB 800 is illustrated here from the top side which receives a balun 805-807 at the center of each dipole. The baluns 805-807 provide impedance matching to interconnecting coaxial cables that route to a switch matrix, and match the balanced radiating elements to the unbalanced transmission line.

Eight such PCB's 800 are assembled side-by-side, baluns up, within the open bottom of the aluminum-on-aluminum honeycomb panel 700 (FIG. 7). These fit onto twenty-two resistive cards 702 to form a twenty-four dipole lateral antenna array like 500 (FIG. 5). The whole box is filled with two-part, expanding urethane foam to make it rugged and weatherproof.

The construction of each dipole antenna 801-803 is unusual, for example in the case of dipole antenna 801, five patch elements on each side 810-819 are interconnected with corner resistors 821-838. The tip-to-tip dipole width was about 18" in one application. The balanced side of balun 805 connects between the centers of patches 814 and 815. The result is a resistor-loaded planar dipole antenna able to operate in the range of 100 MHz to 400 MHz and able to suppress and reach beyond near-field clutter.

Broadband antennas can be created with resistive loading. Each antenna element can be fabricated throughout from a bulk resistive material, or just the corner ends can be loaded with lump resistors. Any resistive loading will diminish the propagating waves as they travel towards the outer ends, and this weakens any wave reflections back in from the ends. As a result, the antenna will not have a pronounced resonance, making it broadband. The input signals will be transmitted with less distortion and antenna ring. Such antennas are not very directive, and produce linearly polarized radiation patterns. The loss loading produces low efficiencies, but the reduced physical volume is a major plus.

A parade of dielectric and conductive objects passing through the near field of an antenna can change the loading ($Z_{in}$) and affect the effective electrical size of the antenna. The corner resistors and segmenting of the patches suppresses and attenuates near field effects. The width of each patch provides a degree of bandwidth spreading, as opposed to dipoles having thin rods with sharp resonances for the radiating elements.

New features are included in PCB 800 to assist in the mechanical assembly of it into lateral antenna array 500 (FIG. 5). Specifically, slots 850-55 and notches 856-861 are cut into the fiberglass-epoxy base material to allow for the insertion of tabs 716 (FIG. 7) of resistive-cards 702. A number of circular fill holes 870-873 and half-round fill holes 874-877 are provided so two-part urethane foam can be poured into the empty cavities formed between the resistive cards 702 and end caps 720 ad 722. Such foam sets as a rigid matrix, but is highly insulating and has very little radio opaqueness. It "glues" and binds the whole together in a highly ruggedized assembly, while still achieving a critical low-weight method of construction.

FIGS. 9 and 10 represent the electrical connection and the mechanical construction of a typical balun like those in FIG. 8. In FIG. 9, a balun 900 is shown connected on its balanced side 901 to a center pair of dipole antenna patches 902 and 904. An unbalanced side 906 of balun 900 connects to a coaxial cable 908 through a connector 910.

FIG. 10 illustrates how a balun 1000 can be constructed to withstand strong vibrations and physical abuse in the field. A center pair of dipole antenna patches 1002 and 1004 are connected to a balun transformer 1006. Both the balun transformer 1006 and a coax connector fitting 1008 are mounted to a fiberglass-epoxy printed circuit board 1010. Matching slots in PCB 1010 and supports 1012 and 1014 are inter-digitated and epoxied together to form a tower. The result is a very rigid structure highly resistant to damage from vibration.

FIG. 11 illustrates how a single dipole antenna and cavity are formed, constructed and joined. A part of a lateral antenna array 1100 includes as many as twenty-four individual dipole-antenna-and-cavities 1102. Each dipole-antenna-and-cavity 1102 is bounded on either lateral side by a resistive card 1104 and 1106, seen here on-edge from the front. A printed circuit board (PCB) antenna 1108 typically carries three adjacent sets of baluns 1110, patch elements 1112, and chip resistors 1114 and 1115.

An aramid fiber honeycomb sandwich-core material panel 1120 is used to enclose the bottom. It is joined all along the bottom-front and bottom-rear edges from end-to-end of an aluminum-on-aluminum honeycomb folded enclosure 1122, as in FIG. 7. DuPont NOMEX™ brand fibers in honeycomb is an industry standard lightweight non-metallic composite. Commercial grade honeycomb is typically made from aramid fiber paper coated with a heat-resistant phenolic resin. Such is resilient, has low density, and a superior strength-to-weight ratio. It is used here this way because downward radiowaves 1124 from antenna element patches 1112 will pass right through unimpeded. A number of fill holes 1126 in the honeycomb sandwich-core material panel 1120 and PCB 1108 are used to insert a 2-part urethane foam 1128 that expands and becomes rigid shortly after mixing its two liquid parts. The rigid foam filling 1128 fully encapsulates the antenna and interior cavity.

Any mechanical braces, brackets, or reinforcements that must be placed inside individual dipole-antenna-and-cavities 1102 should be comprised of phenolic resin reinforced fiberglass, so as to be radio transparent. For example, the attachments necessary for boom 212 (FIG. 2) to the antenna array 110. Small steel fasteners used in conjunction with such brackets and braces seem to have little or no effect on radio function, and so can be used without having to resort to something more exotic.

Although the present invention has been described in terms of the presently preferred embodiments, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the "true" spirit and scope of the invention.

What is claimed is:

1. A municipal infrastructure maintenance system that depends on a ground vehicle to move over large areas or distances, comprising:

an antenna array comprising dozens of compartments of radio dipole antennas arranged laterally, shoulder-to-shoulder across its width;

a number of resistive cards arranged in parallel and as compartment separators between each of said compartmentalized radio dipole antennas;

an aluminum-on-aluminum honeycomb panel laterally scored to be folded around front, top, and back edges of all the resistive cards and interlock with them using slots in the panel and tabs on the respective edges of the resistive cards;

a printed circuit board (PCB) on which said compartmentalized radio dipole antennas are disposed and positioned to close the bottom end of each compartment; and a rigid foam filling disposed inside and encapsulating each said compartment;

wherein said ground vehicle is configured to carry the antenna array for operation as a ground penetrating radar.

2. The municipal infrastructure maintenance system of claim 1, further comprising:

an antenna switch matrix connected between the antenna array and a ground-penetrating-radar (GPR) set and configured to provide electronic aperture switching and selection, and the ability to laterally register one sweep to the next.

3. The municipal infrastructure maintenance system of claim 1, further comprising:

a cantilever boom arranged to attach to said vehicle and to extend the antenna array out in front on a pivotable boom.

4. The municipal infrastructure maintenance system of claim 1, further comprising:

aluminum end caps to fit the opposite ends of the antenna array and to electrically close it;

a ferrite tile disposed inside each aluminum end cap to match the loading effects of a resistive card in a compartment; and a phenolic fiberglass panel epoxied over the ferrite tiles to stabilize and support them in rough service.

5. The municipal infrastructure maintenance system of claim 1, further comprising:

any brackets, braces, or reinforcements disposed inside any of the compartments are comprised of phenolic fiberglass and epoxy materials.

6. The municipal infrastructure maintenance system of claim 1, further comprising:

equally matched components and circuits amongst each and every compartment so as to eliminate artifacts caused by switch between dipole antennas.

7. The municipal infrastructure maintenance system of claim 1, further comprising:

resistive loading between patch antenna elements configured to control and reduce near field effects caused by ground clutter.

8. The municipal infrastructure maintenance system of claim 1, further comprising:
   an advanced CCD processor employing processing techniques that compare and combine multiple sub-sets of all available scan data scans.

9. The municipal infrastructure maintenance system of claim 8, further comprising:
   an advanced CCD processor employing processing techniques that compare and combine multiple sub-sets of all available scan data scans that use machine learning classification techniques to identify target objects and clutter in the data scans.

10. The municipal infrastructure maintenance system of claim 9, further comprising:
   an advanced CCD processor employing processing techniques that compare and combine multiple sub-sets of all available scan data scans that used machine learning classification techniques to identify target objects and clutter in the data scans where the training of the machine classifier is achieved in an automated way.

* * * * *